Figure 1:
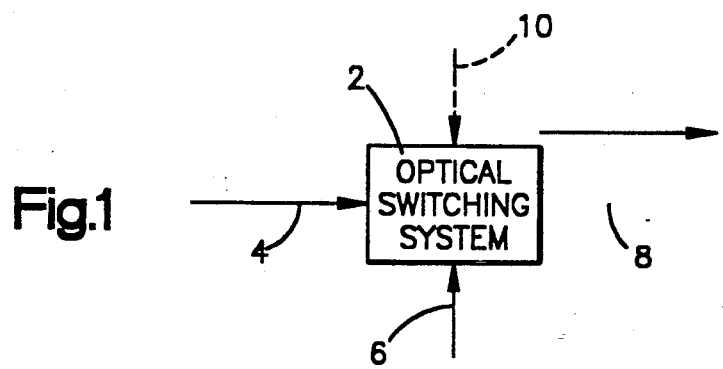

United States Patent [19]
Oudar

[11] Patent Number: 5,189,542
[45] Date of Patent: Feb. 23, 1993

[54] SYSTEM FOR THE OPTICAL SWITCHING OF FREQUENCY MULTIPLEXED SIGNALS

[75] Inventor: Jean-Louis Oudar, Chatenay-Malabry, France

[73] Assignee: France Telecom Etablissement Autonome de Droit Public (Centre National d'Etudes des Telecommunications), Issy-Les-Moulineaux, France

[21] Appl. No.: 731,194

[22] Filed: Jul. 15, 1991

[30] Foreign Application Priority Data

Jul. 17, 1990 [FR] France .................. 90 09108

[51] Int. Cl.$^5$ .................................. H04J 14/02
[52] U.S. Cl. ............................. 359/128; 372/8; 385/17
[58] Field of Search ............. 359/123, 124, 127, 128, 359/117, 118, 191; 385/17; 372/8

[56] References Cited

U.S. PATENT DOCUMENTS 4,807,227  2/1989  Fujiwara et al. .............. 359/128

FOREIGN PATENT DOCUMENTS 0200028  12/1986  European Pat. Off. .......... 359/191
0223258  5/1987  European Pat. Off.

OTHER PUBLICATIONS

Article by H. S. Hinton, IEEE Journal on Selected Areas in Communication, vol. 6, No. 7, Aug. 1988, pp. 1209-1226.
Article by S. Suzuki et al. IEEE Journal of Lightwave Technology, vol. 8, No. 5, May 5, 1990, pp. 660-666.
Article by H. Kawaguchi et al. IEEE Journal of Quantum Electronics, vol. 24, No. 11, Nov. 1988, pp. 2153-2159.
Article by K. Y. Eng, Proceedings of the Fourth Tirrenia International Workshop on Digital Communications, Tirrenia, Sep. 19-23, 1989, pp. 313-323.

*Primary Examiner*—Stephen Brinich
*Assistant Examiner*—Kinfe-Michael Negash
*Attorney, Agent, or Firm*—Pearne, Gordon, McCoy & Granger

[57] ABSTRACT

The system disclosed includes a light source (12) able to emit an intense, coherent, monochromatic beam, called the control beam, whose frequency is equal to the center optical frequency of one of several frequency multiplexed signals, which has been selected, an optical coupler (14) for coupling the signals and the control beam and an optical switching device (16) having an active material with a non-linear optical response, whose passband is narrower than the intervals separating the frequency band occupied by the selected siganl. The device receives the light from the optical coupler and supplies a beam reproducing the information of the selected signal. The invention can be used in telecommunications.

11 Claims, 2 Drawing Sheets

SYSTEM FOR THE OPTICAL SWITCHING OF FREQUENCY MULTIPLEXED SIGNALS

DESCRIPTION

The present invention relates to a system for the optical switching of frequency multiplexed signals. It is more particularly used in the field of optical fibre telecommunications.

In "coherent" optical fibre telecommunications systems, in the same optical fibre it is necessary to mix signals having different "carrier frequencies" or optical center frequencies.

The mixing of several information channels takes place on the basis of different sources, each of the latter being characterized by a carrier frequency. This mixing is generally carried out by means of an optical coupler having several inputs and a single output, which is then coupled to the transmission fibre. Such an operation, which is a frequency multiplexing causes no particular problems and existing optical couplers have satisfactory performance characteristics for this purpose.

However, the situation is different for the demultiplexing operation at the transmission fibre output, said operation aiming at extracting one of the channels, characterized by its carrier frequency, to then transport it either to a photodetector, or to other switching nodes by means of another optical fibre.

In order to carry out this demultiplexing operation, it is known to use a wavelength selective optical filter, whose selectivity is adequate to extract, at the fibre output, one only of the multiplexed channels.

This causes difficulties in view of the fact that the frequency spacing of the different channels is often small, approximately $10^{11}$ Hz, and the passive devices (in the form of diffraction gratings or Fabry-Perot interferometers) having such a selectivity have large dimensions and are expensive, because they are very sensitive to vibrations and mechanical drifts and consequently requires a thermally and mechanically stable environment. In addition, their tuning to a particular frequency, which takes place by mechanical displacements, takes a long time to carry out.

Passive optical filters are also known, which use waveguides having periodic corrugations or ridges and which can be tuned by an electrical control (particularly when produced with semiconductor materials), but it is difficult to obtain with them a selectivity exceeding $10^{12}$ Hz.

The present invention aims at obviating the aforementioned disadvantages by proposing a system for the optical switching of frequency multiplexed signals, which need only occupy a very small volume, so that its sensitivity to vibrations and temperature is less than the aforementioned known devices. The tuning to a particular frequency is carried out electrically and therefore very rapidly, which makes it possible to obtain a selectivity well above $10^{12}$ Hz.

More specifically, the present invention relates to a system for the optical switching of frequency multiplexed optical signals, each of the said signals transporting informations and being associated with a centre optical frequency, characterized in that it has at least one switching means comprising at least one light source able to emit a coherent monochromatic beam, called the control beam, whose frequency is equal to the centre optical frequency of one of the optical signals, namely that which has been selected, and whose amplitude is equal to K times the maximum amplitude of the optical signals, K being an integer at least equal to the number of signals, said control beam being able to interfere with the signal which has been selected, a means for the optical coupling of optical signals and the control beam and an optical switching device having an active material with a non-linear optical response, whose passband is on the one hand narrower than the interval separating the frequency bands occupied by the optical signals and on the other hand wider than the frequency band occupied by the selected optical signal, said device receiving at the input the light from the optical coupling means and supplying at the output an optical beam, which reproduces the informations transported by the selected optical signal, so that the said device has a double filtering and optical switching function.

Thus, the system according to the invention carries out a frequency demultiplexing operation, which is optically controlled. By means of an optical control beam, said system makes it possible to select a particular carrier frequency and obtain at the output a modulated optical beam only containing the informations associated with said carrier frequency. Thus, it is indeed a system for the optical switching of frequency multiplexed signals.

One of the original points of the system according to the invention is that it is an active system, which is consequently not only able to select a particular channel, but also amplify its signals.

Moreover, in certain special embodiments of this system, the regeneration of the selected signal can be carried out at a carrier frequency different from the frequency of the channel selected at the input, which widens the operational possibilities of the system.

Moreover and as will be shown hereinafter, it is possible to associate in juxtaposed manner several systems according to the invention in order to obtain a frequency multiplexed signal optical switching matrix.

According to a first embodiment of the system according to the invention, the optical switching device is an intrinsic optical bistable device (having a low switching threshold and a high switching threshold).

In a first system corresponding to this first embodiment, the intensity of the control beam is below the low switching threshold of the intrinsic bistable device and the latter is chosen in such a way that its bistability range, i.e. the frequency range where said device has the bistability phenomenon, contains the centre optical frequency of the selected signal, the frequency of the optical beam supplied by the output of said device being equal to said centre optical frequency of the selected signal.

In a second system also corresponding to the first embodiment, use is also made of another light source able to emit a monochromatic beam, called the maintenance beam, whose frequency is contained in the bistability range of the device, the optical coupling means being provided to couple the optical signals and the control beam, as well as the maintenance beam, the sum of the respective intensities of the control beam and the maintenance beam being below the low switching threshold of the device and the frequency of the control beam is contained in the absorption range of the active material of the bistable device, the informations transported by the selected optical signal then being reproduced, at the output of the bistable device, by an optical beam, whose frequency is equal to the frequency of the maintenance beam.

The frequency of the maintenance beam can be regulated.

According to a second embodiment of the system according to the invention, the optical switching device is a bistable laser, which is supplied by an electric current, whose intensity is below the low switching threshold of said bistable laser, the informations transported by the selected optical signal then being reproduced, at the output of the bistable laser, by an optical beam, whose frequency is equal to the emission frequency of said bistable laser.

The emission frequency of the bistable laser can be regulated.

The system according to the invention can also have an optical isolator at the input of the optical switching device.

Finally, the system according to the invention can have a plurality of switching systems forming a switching matrix.

The invention is described in greater detail hereinafter relative to non-limitative embodiments and with reference to the attached drawings, wherein show:

FIG. 1 a diagrammatic representation of a system according to the invention.

Figure 2A:
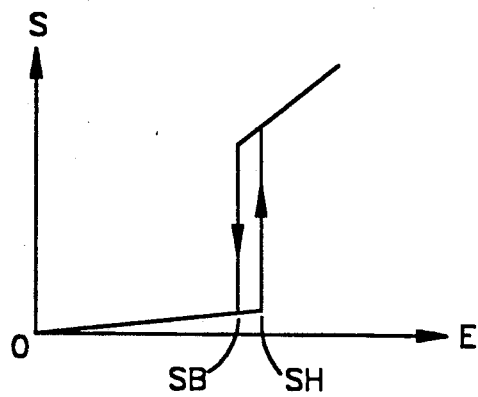
Figure 2B:
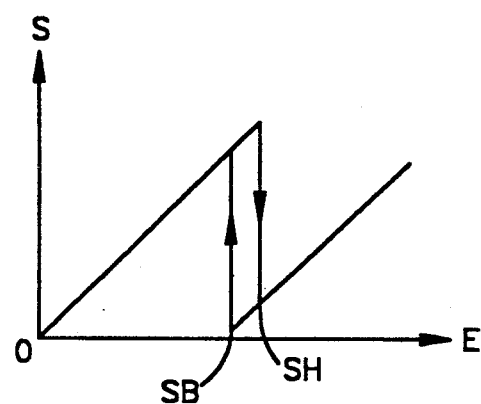

FIGS. 2A and 2B hysteresis characteristics of intrinsic, optical bistable devices usable in the present invention.

Figure 3:
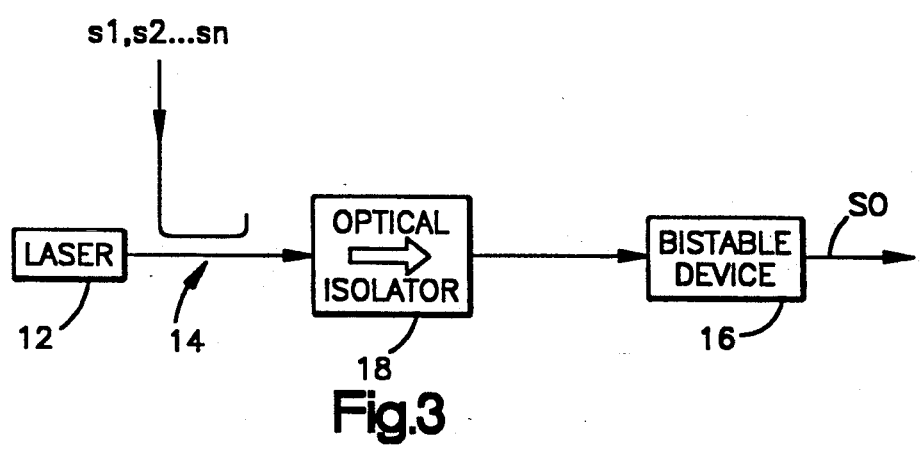

FIG. 3 a diagrammatic view of a system according to the invention using an intrinsic optical bistable device.

Figure 4:
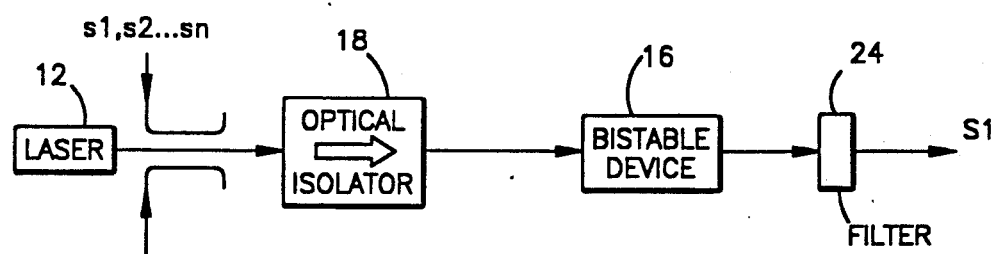

FIG. 4 a diagrammatic view of another system according to the invention also using an intrinsic optical bistable device.

Figure 5:
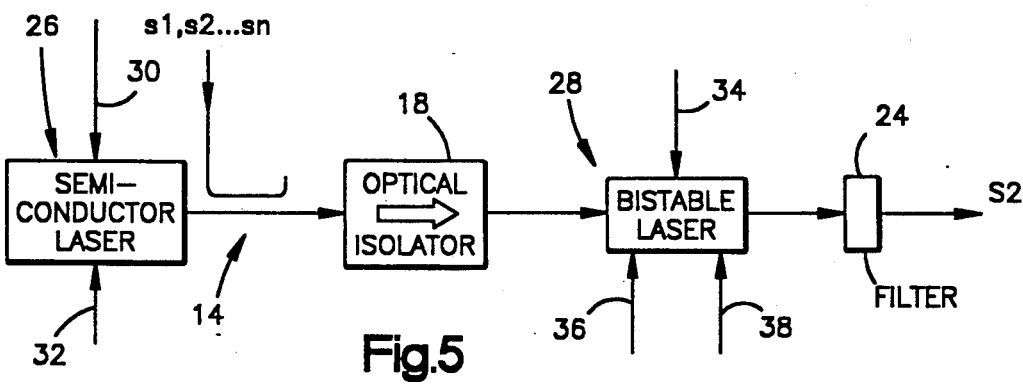

FIG. 5 a diagrammatic view of a system according to the invention using a bistable laser.

Figure 6:
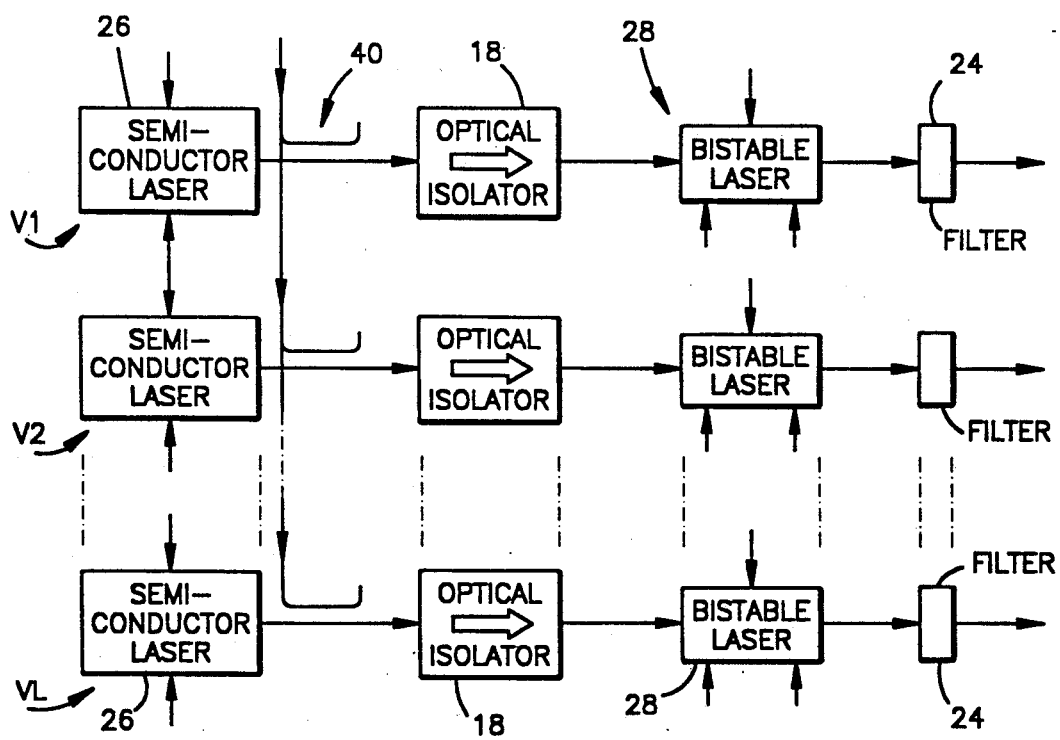

FIG. 6 a diagrammatic view of an optical switching matrix produced by means of a plurality of systems according to the invention.

The principle of the invention will be explained relative to FIG. 1. It is based on the combination of optical switching and optical homodyning.

Optical switching is used for optically controlling the transmission of optical beams and optionally for transposing their frequencies.

It is of particular interest when these optical beams are optical signals transporting informations, as is the case with optical fibre transmissions.

Optical switching is characterized in that the output signals produced by it are of an optical nature. Optical switching is carried out by using the non-linear optical response of appropriate materials and in particular the refractive index or absorption coefficient variations with the incident light intensity, in order to modulate the phase or intensity of one or more optical beams to be controlled.

In preferred manner, said operation takes place in optical bistable devices as a result of the sudden transitions to which they are exposed, said devices making it possible to carry out clearly defined switching operations on the optical signals to be processed.

Optical switching is of interest because it makes it possible to carry out electronics functions without passing via electrical signals. It is therefore possible to retain the properties of an extensive passband and immunity to electrical interference, which are the main advantages of optics in information processing.

Optical homodyning is used for selectively detecting one from among a number of channels, the latter being characterized by different carrier frequencies in each case. Optical homodyning is carried out by superimposing on the sensitive part of an optical switching device incorporating an active material with a non-linear optical response, e.g. an optical bistable device, all the frequency multiplexed signals, as well as an intense, monochromatic optical beam, called local oscillator, whose frequency is equal to that of the channel which is to be selectively detected. The principle of this selection is that the optical bistable device reacts in quadratic manner to the superimposing of the electromagnetic fields at the sensitive surface.

As the field of the local oscillator has a much high amplitude than those of the different multiplexed signals, the interference term enters the said local oscillator and the selected optical signal preponderates compared with the other terms, particularly those not involving the local oscillator.

A system according to the invention resulting from the combination of optical switching and optical homodyning is diagrammatically shown in FIG. 1. This system, which carries the reference 2 in FIG. 1, receives at the input an optical beam 4, which carries generally polarized, frequency multiplexed optical siganls, as well as an optical control signal 6 and supplies at the output an optical beam 8, which "reproduces" the selected optical signal.

In certain cases considered hereinafter, the system may require an electric power supply symbolized by the arrow 10.

As has been shown, the amplitude of the optical control beam is much higher than the amplitude of the different multiplexed siganls and more specifically is equal to K times the maximum amplitude of said different multiplexed siganls, in which K is an integer at least equal to the number of multiplexed siganls.

The crucial point making it possible to associate optical homodyning and optical switching is the use of a non-linear optical response, whose passband is narrower than the frequency separation of the different multiplexed channels, i.e. narrower than each of the frequency intervals separating these different channels. It is in this way that the sought selectivity is obtained.

Another important condition in the present invention is that the passband of the non-linear response is wider than the modulation band of the channel to be switched, i.e. the frequency band occupied by said channel.

Under these conditions, the optical control signal, which s more intense than the siganls to be demultiplexed, can be easily mixed with these signals, e.g. with the aid of an optical fibre coupler.

Only the channel at the same frequency as the control beam interferes with the latter in a coherent manner and gives it a modulation, whose passband is narrower than the non-linear passband of the optical switching device used. Therefore the latter only reacts with the channel in question and "transcribes" to the optical beam which it supplies at the output the informations on the selected channel. The amplitude of the transcribed modulation is, in known manner, dependent on the relative phase and polarization of the control beam and the selected channel.

Various performance examples of the invention will be given hereinafter. The optical switching device used can be an intrinsic, optical, bistable device. Such a bistable device generally comprises an optical cavity of the Fabry-Perot type containing an active material with a non-linear optical response, whose refractive index varies with the energy density accumulated in the material by photoexcitation, the latter being due to the incident radiation.

For example, in a semiconductor material, said energy is in the form of electron-hole pairs, resulting from the optical excitation of electrons of the valency band towards the conduction band. The presence of photoexcited electron-hole pairs then modifies the refractive index of the semiconductor material.

Such a material, incorporated into an optical cavity and subject to a coherent radiation, whose wavelength is close to the absorption edge of the semiconductor material constitutes an intrinsic, optical, bistable device.

Such an optical, bistable device can pass from the "conductive" to the "non-conductive" state and vice versa by varying the incident light intensity on either side of the switching thresholds SB (bottom threshold) and SH (top threshold) of the bistable device, in accordance with a particular hysteresis cycle.

FIGS. 2A and 2B are graphs illustrating the behaviour of the two intrinsic, optical, bistable devices differing by their hysteresis cycles. In each of these two graphs, light intensities are plotted on the abscissa and ordinate. The abscissa axis corresponds to the input of the device and the ordinate axis to its output.

FIG. 2A shows that the device corresponding thereto supplies an output signal S, which reproduces the modulation of the input signal E with the same time variations as those of the latter. However, with the device according to FIG. 2B, the output signal S reproduces the modulation of the input signal E with time variations opposite to those of the latter.

Document (1), i.e. R. Kuszelewicz, J. L. Oudar, J. C. Michel and R. Azoulay, "Monolithic GaAs/AlAs optical bistable etalons with improved switching characteristics", Appl. Phys. Lett. 53(22), Nov. 28, 1988, pp. 2138 to 2140, describes a bistable device, which can be formed by a stack of epitaxied layers in the AlGaAs system with different aluminium concentrations.

For beams focussed in accordance with a diameter smaller than 10 micrometers, the value of the top threshold SH is below 10 mW.

The passband of said device can be adjusted during the manufacture by modifying the life of the photoexcited carriers in the active layer. A typical value for this life is 10 ns for good quality GaAs. This gives a passband of approximately 10 MHz. This passband can be extended up to at least 1 GHz by introducing impurities or structural defects (e.g. by ion explanation) into the active material.

In the case when it is wished to produce an optical switching matrix comprising a plurality of such intrinsic, optical, bistable devices, such defects are automatically introduced on producing microresonators having small lateral dimensions, in order to locate said devices on a substrate, e.g. by reactive ionic etching of the stack of epitaxied layers around the zone to be retained.

It is known that the surface recombination centres present on the edges of the zone to be etched lead to a shortening of the life, as is described in document (2): J. L. Jewell et al., "GaAs-AlAs monolithic microresonator arrays", Appl. Phys. Lett. 51(2), Jul. 13, 1987, pp. 94 to 96 and thus making it possible to increase the passband.

This passband always remains below 10 GHz, which makes it possible to retain an adequate selectivity for the separation of the multiplexed channels.

A description will now be given of two systems according to the invention, both of which use as the optical switching device an intrinsic, optical, bistable device, the first of these systems making it possible to obtain an output signal having the same carrier frequency as that of the selected input channel (FIG. 3), whilst the second system makes it possible to obtain an output signal having a carrier frequency different and independent from that of the selected channel (FIG. 4).

The system diagrammatically shown in FIG. 3 comprises a laser 12, which emits an intense coherent beam, called the control beam, whose frequency is equal to the carrier frequency which it is wished to select and whose polarization and phase are adjusted so as to maximize the interference of said control beam with the selected channel.

Processes are known for this purpose, which make the polarization and phase of the control beam dependent on that of an incident signal (selected channel).

The system of FIG. 3 also has an optical coupling means 14 (e.g. an optical fibre coupler, a hologram or a partly reflecting mirror), which serves to mix the control beam with the multiplexed optical siganls s1, s2, .. . sN.

The system of FIG. 3 also has a intrinsic, optical, bistable device 16 receiving at the input the mixture of the multiplexed siganls and the control beam. This device 16 is chosen in such a way that its frequency range, where it is effectively bistable, contains the carrier frequency of the signal which it is wished to select.

Moreover, the laser 12 is regulated in such a way that the intensity of the control beam is below the bottom switching threshold SB of the bistable device 16 (but is obviously sufficiently high to enable the beam reaching the input of said device to bring about the switching thereof).

In the presence of multiplexed siganls, the channel whose carrier frequency is identical to that of the control beam is coherently mixed with the latter and the information siganls transmitted on said channel pass the bistable device from its conductive state into its non-conductive state and vice versa.

The system of FIG. 3 can also have an optical isolator 18, which is located at the input of the bistable device 16 and which ensures that the light from the laser 12 and reaching the said device 16 is not returned to the laser 12, which would possible disturb the operation of the latter.

The power of the output signal SO supplied by the bistable device 16 is only slightly below that of the control beam and consequently, as a result of the homodyning, is well above the power of each of the multiplexed siganls s1, s2, . . . sN.

Thus, the system of FIG. 3 amplifies that of the siganls s1, s2, . . . sN which is chosen at the same time as it selects the chosen signal.

To pass from one channel to the other, it is necessary to change the frequency of the control beam emitted by the laser 12, which acts like a local oscillator. For this purpose the laser 12 is constituted by a frequency-tunable laser (it being understood that for each channels change there is a possible readjustment of the polarization and phase of the control beam as a function of those of the new selected channel).

It may also be necessary to readjust the resonant frequency of the intrinsic, bistable device 16, which can take place by using various means, e.g. based on the electrooptical effect, the piezoelectric effect, or more simply temperature variations.

This readjustment is generally less critical than regulating the frequency of the local oscillator, because the typical passband of a Fabry-Perot resonator usable for obtaining an intrinsic, bistable device is approximately $10^{12}$ Hz, whereas the local oscillator frequency must be regulated with a better precision than the modulation passband of the selected signal.

To obtain an output signal at a frequency different from that of the selected input channel, the system of FIG. 3 is modified in the manner indicated hereinafter with reference to FIG. 4.

To the system of FIG. 3 is added another laser 20 which emits an intense beam, called the maintenance beam and the coupling means 14 is replaced by another optical coupling means 22 for mixing the control beam from the laser 12, the maintenance beam from the laser 20 and the multiplexed siganls s1, s2, ... sN.

In the case of the system of FIG. 4, preference is given to the use of the optical isolator 18 for preventing the light beam reaching the device 16 from returning to the lasers 12 and 20, which might disturb their operation.

In order to obtain an output signal S1 of different frequency from that of the selected channel in the system of FIG. 4, a separation is made between the functions of optical stability and selection-amplification by homodyning by mixing with the multiplexed siganls present at the system input two instead of one monochromatic beam, namely the control beam and the maintenance beam.

The laser 20 is such that the frequency of said maintenance beam is in the frequency range where the device 16 is bistable.

Thus, the characteristics of FIG. 2A or FIG. 2B (as a function of the chosen device 16) are obtained when the incident light power on the device 16 varies.

Moreover, the lasers 12 and 20 are regulated in such a way that the sum of the intensities of the maintenance beam and the control beam are below the bottom threshold SB of the device 16 (but obviously sufficiently high to ensure that the beam reaching the input of said device is able to bring about the switching thereof).

The control beam once again forms a local oscillator tuned to the carrier frequency of the selected input channel. The output siganls S1 of the system is obtained at the frequency of the maintenance beam.

The system of FIG. 4 also has a filtering means 24 positioned at the output of the bistable device 16 and which separates the output signal S1 from the other optical components from the intrinsic, bistable device 16. Therefore only said signal S1 is obtained at the output of the filtering means 24. The latter can be a wavelength filter essentially for eliminating the intense control beam.

As a variant, it is possible to use a polarization means in association with a control beam and a maintenance beam, whose polarizations are linear and perpendicular to one another.

The operation of the system of FIG. 4 differs from that of FIG. 3. Thus, in the system of FIG. 3, the selected input signal directly interferes with the control beam and modifies its intensity.

Thus, on the curve of FIG. 2A or FIG. 2B, said selected signal "displaces" the operating point of the bistable device 16 on either side of the switching thresholds SB and SH.

In the system of FIG. 4, the maintenance beam maintains a constant intensity, but the interference of the selected signal and the local oscillator produces supplementary electron-hole pairs in the active layer of the intrinsic, bistable device 16 (assuming that the latter is produced from a semiconductor material), which has the effect of "switching" said device from one state to the other.

It is pointed out that for obtaining said switching, the laser 12 is chosen in such a way that the wavelength of the control beam is located within the absorption range of the active layer of the intrinsic, bistable device.

In the present invention, the optical switching device can also be constituted by a bistable laser.

Consideration will e.g. be given to a semiconductor laser, which is very suitable for such applications.

It is pointed out that in such a laser, the population inversion is obtained by injecting an electric current into a p-n junction and the laser effect is produced beyond a certain current, which is referred to as the "threshold current".

When the current injection is not uniform in the p-n junction, certain zones, whose optical pumping is weaker than for other zones, are not made amplifying and remain slightly absorbing.

Nevertheless, this slight absorption can be saturated by the actual laser emission and in this case a current-power characteristic is obtained, which has a hysteresis. The emitted power has a marked discontinuity for certain values of the injected current corresponding to the switching thresholds SB and SH.

Reference should be made in this connection to document (3): H. Kawaguchi, "Optical input and output characteristics for bistable semiconductors lasers", Appl. Phys. Lett. 41(8), Oct. 15, 1982, pp. 702 to 704.

With a view to use in the present invention, the interesting feature of these bistable layers is that the switching beyond a switching threshold can be controlled by an optical signal.

For producing on the basis of a bistable laser a switching system according to the invention, it is merely necessary in the example described with reference to FIG. 3 to mix the multiplexed input siganls with a control beam serving as a local oscillator, to direct the resultant beam of the mixture onto the p-n junction of the bistable laser and to supply the latter with an electric current, whose value is adjusted to a value below the bottom threshold SB of the bistable laser (but which is obviously sufficiently high to ensure that the beam reaching the input of said bistable laser is able to ring about the switching thereof).

The homodyning of the selected input signal produces a selective modulation of the control beam, which is solely dependent on the information present on the selected channel.

This modulation "switches" the bistable laser on either side of switching thresholds and the power emitted by the bistable laser undergoes a modulation under the effect of these switching operations.

The beam emitted by this bistable laser constitutes the output signal of the system, which is filtered so as only to retain the information-carrying signal of the selected input signal (the filtered signal having the emission frequency of the bistable laser as the centre optical frequency).

Recent developments in semiconductor laser technology have made it possible to produce "multisection" lasers having several control electrodes, namely one electrode for injecting current, one electrode for wavelength tuning and a modulation electrode. Reference can e.g. be made in this connection to document (4): S. Murata, I. Mito and K. Kobayashi, Electron. Letters 23(8) 1987.

The application of a voltage to said modulation electrode makes it possible to carry out a non-uniform injection of current into the p-n junction and thus obtain in an easily controllable manner a bistable laser characteristic. A supplementary advantage of this laser type is that the emitted wavelength can be electrically controlled.

FIG. 5 diagrammatically shows another system according to the invention resulting from the association of two wavelength-tunable semiconductor lasers. More specifically, the system of FIG. 5 comprises a semiconductor laser 26 for operating continuously and for serving as a local oscillator, as well as a second semiconductor laser 28 for operating in bistable manner.

The multiplexed siganls s1, s2, ... sN are mixed, due to the coupling means 14, with the control beam from laser 26 and the beam resulting from this mixture is supplied across the optical isolator 18 to the input of the bistable laser 28. The laser 26 makes it possible to select, by homodyning, one of the multiplexed channels as a function of its carrier frequency.

As for the laser 12 of FIGS. 3 and 4, the polarization and phase of the beam emitted by the laser 26 are dependent on those of the selected channel.

The arrow 30 in FIG. 5 symbolizes the injection electrode of the laser 26, whilst the arrow 32 symbolizes the wavelength tuning electrode of said laser 26 making it possible to control the emission frequency of the latter, with a view to making it equal to the carrier frequency of the channel which it is wished to select.

The laser 28, which functions in a bistable manner, makes it possible to re-emit the signal which has been selected by homodyning on a different carrier frequency, which is adjustable by an electric control.

In FIG. 5 an arrow 34 symbolizes the injection electrode of the laser 28 and an arrow 36 the wavelength tuning electrode of said laser making it possible to control its emission frequency, whilst an arrow 38 symbolizes the modulation electrode of said laser 28 making it possible to control the bistability thereof.

The system 5 also has the filtering means 24 positioned at the output of the laser 28 and which makes it possible to eliminate from the beam supplied by said laser 28 the light from the laser 26, so that at the output of the filtering means 24 there is only a signal S2, which reproduces the information of the channel selected by the system of FIG. 5.

A system according to the invention is also obtained by associating a plurality of systems of the type shown in FIG. 4 of a plurality of systems of the type shown in FIG. 5, with a view to obtaining an optical switching matrix.

It is pointed out that if N multiplexed channels reach the input of a system according to FIG. 5 and if the corresponding bistable laser is able to emit on M different carrier frequencies, it is possible to produce with the aid of a single system according to FIG. 5, one interconnection from among the N×M possible interconnections between the N input frequencies and M output frequencies.

On using a system according to FIG. 4, the M different carrier frequencies can be obtained by using a tunable laser 20 able to emit on M different frequencies.

An optical switching matrix according to the invention is diagrammatically shown in FIG. 6 and has L systems carrying the references V1, V2, ... VL and which are e.g. of the type shown in FIG. 5, except that in the case of FIG. 6 the L coupling means 14 are replaced by a coupling system 40 for supplying into each of the systems V1, V2, ... VL the signals s1, s2, ... sN.

Such a matrix makes it possible to simultaneously produce several interconnections by distributing, as has been shown, all the N input signals s1, s2, ... sN on each of the L systems V1, V2, ... VL. Each of the latter has an oscillator which is tunable independently of the others and also an emission frequency adjustable independently of the others.

All these L systems constitute a switching matrix with L links between N inputs and M outputs. The L output siganls can then be mixed in the same not shown, optical fibre.

I claim:

1. A system for the optical switching of frequency multiplexed optical siganls (s1, s2, ... sN), each of said siganls transporting information and being associated with a center optical frequency, characterized in that it has at least one switching means comprising at least one light source (12) able to emit a coherent monochromatic beam, called a control beam, whose frequency is equal to the center optical frequency of a selected one of the optical siganls and whose amplitude is equal to K times the maximum amplitude of the optical siganls, K being an integer at least equal to the number of siganls, said control beam being able to interfere with the signal which has been selected; an optical coupling means (14,22,40) which optically couples the optical signals and the control beam; and an optical switching device (16,28) having an active material with a non-linear optical response, whose passband is narrower than the intervals separating frequency bands occupied by the optical siganls and wider than a frequency band occupied by the selected optical signal, said switching device (16,28) receiving at an input the optically coupled light from the optical coupling means (14,22,40) and supplying at an output an optical beam, which reproduces the information transported by the selected optical signal, so that said switching device has both filtering and optical switching functions.

2. A system according to claim 1, characterized in that the optical switching device is an intrinsic, optical, bistable device (16).

3. A system according to claim 2, characterized in that the intensity of the control beam is below the low switching threshold of the intrinsic bistable device (16) and the bistable device is chosen in such a way that its bistability range contains the center optical frequency of the selected signal, the frequency of the optical beam supplied by the output of said bistable device (16) being equal to said center optical frequency of the selected signal.

4. A system according to claim 2, characterized in that it further comprises another light source (20) able to emit a monochromatic beam, called a maintenance beam, whose frequency is contained in the bistability range of the bistable device, wherein the optical coupling means (22) couples the optical siganls, the control beam, and the maintenance beam, the sum of the respective intensities of the control beam and the maintenance beam being below the low switching threshold of the bistable device and the frequency of the control beam is contained in the absorption range of the active material of the bistable device (16), the information transported by the selected optical signal then being reproduced, at the output of the bistable device, by an optical beam, whose frequency is equal to the frequency of the maintenance beam.

5. A system according to claim 4, characterized in that the frequency of the maintenance beam is regulatable.

6. A system according to claim 1, characterized in that the optical switching device is a bistable laser (28), which is supplied by an electric current having an intensity below the bottom switching threshold of said bistable laser, the information transported by the selected optical signal then being reproduced, at the output of the bistable laser, by an optical beam, whose frequency is equal to that of the emission beam of said bistable laser (28).

7. A system according to claim 6, characterized in that the emission frequency of the bistable laser (28) is regulatable.

8. A system according to claim 1, characterized in that the frequency of the control beam is regulatable.

9. A system according to claim 1, characterized in that it further comprises an optical isolator (18) at the input of the optical switching device (16,28).

10. A system according to claim 5, characterized in that it has a plurality of optical switching devices (V1,V2, ... VL) forming a switching matrix and in that the frequency of the control beam is regulatable.

11. A system according to claim 7, characterized in that it has a plurality of optical switching devices (V1,V2, ... VL) forming a switching matrix and in that the frequency of the control beam is regulatable.

* * * * *

UNITED STATES PATENT AND TRADEMARK OFFICE
CERTIFICATE OF CORRECTION

PATENT NO. : 5,189,542

DATED : February 23, 1993

INVENTOR(S) : Jean-Louis Oudar

It is certified that error appears in the above-identified patent and that said Letters Patent is hereby corrected as shown below:

Column 1, line 40, delete "requires" and insert --require--.

Column 4, line 15, delete "high" and insert --higher--;
          line 35, delete "siganls" and insert --signals--;
          line 37, delete "siganls" and insert --signals--;
          line 38, delete "siganls" and insert --signals--;
          line 51, delete "s" and insert --is--; and
          line 51, delete "siganls" and insert --signals--.

Column 5, line 51, delete "explanation" and insert --implantation--.

Column 6, line 27, delete "siganls" and insert --signals--;
          line 31, delete "siganls" and insert --signals--;
          line 41, delete "siganls" and insert --signals--;
          line 44, delete "siganls" and insert --signals--;
          line 51, delete "possible" and insert --possibly--;
          line 57, delete "siganls" and insert --signals--; and
          lines 58 and 59, delete "siganls" and insert --signals--.

UNITED STATES PATENT AND TRADEMARK OFFICE
CERTIFICATE OF CORRECTION

PATENT NO. : 5,189,542

DATED : February 23, 1993

INVENTOR(S) : Jean-Louis Oudar

It is certified that error appears in the above-identified patent and that said Letters Patent is hereby corrected as shown below:

```
Column 7, line 22, delete "siganls" and insert --signals--;
         line 32, delete "siganls" and insert --signals--;
         and
         line 51, delete "siganls" and insert --signals--.

Column 8, line 48, delete "siganls" and insert --signals--;
         and
         line 55, delete "ring" and insert --bring--.

Column 9, line 26, after "from" insert --the--.

Column 10, Claim 1, line 27, delete "siganls" and insert --
         signals--;
         Claim 1, line 33, delete "siganls" and insert --
         signals--;
         Claim 1, line 35, delete "siganls" and insert --
         signals--;
         Claim 1, line 43, delete "siganls" and insert --
         signals--; and
         Claim 4, line 68, delete "siganls" and insert --
         signals--.
```

Signed and Sealed this

Twenty-eighth Day of December, 1993

*Attest:*

BRUCE LEHMAN

*Attesting Officer*     *Commissioner of Patents and Trademarks*